United States Patent [19]

Joynson et al.

[11] 4,005,385
[45] Jan. 25, 1977

[54] PATTERN RECOGNITION MACHINE FOR ANALYZING LINE ORIENTATION

[75] Inventors: Reuben E. Joynson, Alplaus; Joseph L. Mundy, Schenectady, both of N.Y.; Ranan Banerji, Philadelphia, Pa.

[73] Assignee: General Electric Company, Schenectady, N.Y.

[22] Filed: June 23, 1975

[21] Appl. No.: 589,432

[52] U.S. Cl. ............ 340/146.3 AE; 340/146.3 MA
[51] Int. Cl.² ........................................ G06K 9/00
[58] Field of Search ........ 340/146.3 AE, 146.3 MA

[56] References Cited

UNITED STATES PATENTS

3,859,515   1/1975   Radcliffe ................ 340/146.3

Primary Examiner—Joseph M. Thesz
Attorney, Agent, or Firm—Jack E. Haken; Joseph T. Cohen; Jerome C. Squillaro

[57] ABSTRACT

Line and edge features on the peripheral segments of a two dimensional data scene are classified by data manipulations in the Hadamard transform domain. One dimensional transform coefficients which uniquely determine the classifications are extracted through weighting by submatrices characteristic of the peripheral segments.

22 Claims, 15 Drawing Figures

Fig. 1

| | H(0) | H(1) | H(2) | H(3) | CLASS |
|---|---|---|---|---|---|
|  | 0 | 0 | 0 | 0 | EMPTY |
|  | 1 | 1 | 1 | 1 | PLUS |
|  | 2 | 2 | 0 | 0 | |
|  | 3 | 1 | −1 | 1 | |
|  | 2 | −2 | 0 | 0 | MINUS |
|  | 3 | −1 | −1 | −1 | |
|  | 1 | −1 | 1 | −1 | |
|  | 1 | −1 | −1 | 1 | PLUS−MINUS |
|  | 1 | 1 | −1 | −1 | |
|  | 2 | 0 | −2 | 0 | |
|  | 2 | 0 | 2 | 0 | MINUS−PLUS |
|  | 3 | −1 | 1 | 1 | |
|  | 3 | 1 | 1 | −1 | |
|  | 2 | 0 | 0 | −2 | BUSY |
|  | 2 | 0 | 0 | 2 | |
|  | 4 | 0 | 0 | 0 | FULL |

| 8 | 8 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |
| 8 | 8 | 0 | 0 | 0 | 0 | 0 | 0 | 0 | 0 | 0 | 0 | 0 | 0 | 0 | 0 |

| 8 | -8 | 0 | 0 | 0 | 0 | 0 | 0 | 0 | 0 | 0 | 0 | 0 | 0 | 0 | 0 |
|---|----|---|---|---|---|---|---|---|---|---|---|---|---|---|---|
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |

| 8 | -8 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| -8 | 8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| -8 | 8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| -8 | 8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| -8 | 8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| -8 | 8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| -8 | 8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| -8 | 8 | 0 | 0 | 0 | 0 | 0 | 0 | 0 | 0 | 0 | 0 | 0 | 0 | 0 | 0 |
| 8 | -8 | 0 | 0 | 0 | 0 | 0 | 0 | 0 | 0 | 0 | 0 | 0 | 0 | 0 | 0 |
| -8 | 8 | 0 | 0 | 0 | 0 | 0 | 0 | 0 | 0 | 0 | 0 | 0 | 0 | 0 | 0 |

Fig. 10

PATTERN RECOGNITION MACHINE FOR ANALYZING LINE ORIENTATION

BACKGROUND OF THE INVENTION

This invention concerns machines for recognizing and extracting information from patterns of data. More specifically this invention concerns machines for determining the angle and orientation of lines in a two dimensional scene by use of Hadamard transform coefficients.

Machines for extracting information from large sets of data have become increasingly important in the automation arts. These machines are capable of recognizing information contained in the features of the data set and of rejecting noise or background information. Pattern recognition machinery of this type presently finds use in optical character readers, guidance and inspection systems, and many other sectors of that art. Often the data set is in the form of video scene information which may, for example, be derived from a television camera pickup or from a radar or sonar scanning system.

Early pattern recognition machines operated by comparing small sectors of scene data with suitable masks representing the desired pattern information. More useful information can be extracted from such scene data, however, if the pattern information produced is of a more fundamental nature. For example, if the position and angle of a line or edge in the scene is known, it is possible, by the application of relatively simple data manipulation, to follow and trace the path of that line or edge.

It is well known that any function having finite energy may be expressed as the sum of a series of orthogonal functions. In 1923 Joseph L. Walsh devised a complete set of orthogonal functions, now known as Walsh functions, which are especially useful for the representation of binary waveforms. Walsh functions, which are denoted by the expression $$\text{wal }(s,t),$$

are binary functions having values of $+1$ and $-1$ in the unit interval. The sequency, $s$, of a Walsh function is defined herein as the number of times the value of that function changes sign within the unit interval (the term "sequency" is also used in the literature to denote one-half the number of sign changes in the unit interval). The sequency of a Walsh function may be seen to be somewhat analogous to the frequency of the more common sine or cosine functions.

A series of Walsh functions may be expressed in a matrix, known as a Hadamard matrix, in which elements are either $+1$ or $-1$ and in which the respective row vectors and the respective column vectors are mutually orthogonal. The values of the elements in a row or column of a Hadamard matrix represent the values of a Walsh function over sequential segments of the unit interval. Successive examination of the rows or columns of a Hadamard matrix yields a set of Walsh functions which are known as Hadamard functions denoted $$H(n,t).$$

The natural order $n$, of a Hadamard function denotes the order in which that function is generated from a Hadamard matrix in the manner described above which is not the sequency order. Further discussion of the properties of Hadamard and Walsh functions and of algorithms for generating Hadamard matrices may be found in H. F. Harmuth, *"Transmission of Information by Orthogonal Functions"*, Second Edition, Springer-Verlag, 1972.

The Walsh transform vector $\overline{w}_a$ of a binary function vector $\overline{f}$ may be expressed in matrix notation as:

$$\overline{w}_a = [\text{ wal }] \overline{f}_a \qquad (1)$$

where [ wal ] is a matrix whose rows are sequency ordered Walsh functions. The order of a Walsh transform, as defined herein, means the number of dimensions in the vector $\overline{w}_a$ which may be seen to equal the rank of the matrix [ wal ]. A Hadamard transform is a Walsh transform wherein the matrix [wal] is a Hadamard matrix.

Machines for generating the value of Walsh functions are well known in the computing arts. For example, U.S. Pat. No. 3,701,143 to Nacht, U.S. Pat. No. 3,795,864 to Fullton, Jr., and U.S. Pat. No. 3,742,201 to Groginski, describes such machine. A copending U.S. Patent Application by Ruben E. Joynson and Joseph L. Mundy, Ser. No. 563,820 of common assignee, describes a fast Hadamard transform generating machine which yields serial streams of Hadamard transform coefficients in sequency order.

Two dimensional Hadamard transforms may be used to represent variations in brightness over a two dimensional video scene. Further information on the generation and use of two dimensional Hadamard transforms in this application may be found in the abovementioned Harmuth reference. Our copending patent application, referenced above, describes a machine for generating a matrix of two dimensional Hadamard transform coefficients from video information.

SUMMARY OF THE INVENTION

In accordance with the present invention, we provide machines for extracting angle and orientation information from lines and edges in a video scene. The scene information is encoded into an electrical data signal by a television camera or other similar device. This data is processed to yield a two dimensional, sequency order Hadamard transform coefficient matrix, the elements of which matrix are processed to yield output data indicating the character of line and edge data in the peripheral segments of the scene. In a preferred embodiment of the invention, the values of low order elements in a two dimensional Hadamard transform coefficient matrix are weighted and compared to yield information on line and edge crossings in the peripheral segments of a video scene.

It is, therefore, an object of this invention to provide machines for recognizing edge characteristics in two dimensional data patterns.

Another object of this invention is to provide machines for recognizing patterns of line and edge information in the peripheral segments of a two dimensional data set.

Another object of this invention is to provide machines for utilizing the Hadamard transform in adaptively determining pattern information from video data sets.

BRIEF DESCRIPTION OF THE DRAWINGS

The novel features believed to be characteristic of the present invention are set forth in the appended claims. The invention itself, together with further objectives and advantages thereof, may best be understood with reference to the following detailed description, taken in connection with the appended drawings in which:

FIG. 3 is a machine for processing the Hadamard transform coefficients of a scene in accordance with the logic sequence of FIG. 2a;

FIGS. 5a–8a and 5b–8b, respectively, illustrate peripheral segments of a 16 × 16 element scene and Hadamard matrices characteristic of those segments;

DESCRIPTION OF THE PREFERRED EMBODIMENTS

The present invention provides machines for determining the characteristics of lines and area edges in two dimensional sets of data. Large fractions of the information in many scenes may be efficiently derived from the direction and orientation of these data features. For example, when the position and direction of a line element is known, relatively simple algorithms may be derived for tracing the course of that line through the scene. The direction of line and edge elements on the periphery of a small subset of a larger scene may be used to direct a pattern recognition machine toward concentrations of relevant information in neighboring scene areas.

We have determined that line angle and scene edge characteristic information may be efficiently derived by processing video data in the two dimensional Hadamard transform domain. The Hadamard transform process serves to filter noise and allows speedy extraction of relevant information. The Hadamard transform generator of copending U.S. Patent application, Ser. No. 563,820, referenced above, allows rapid conversion of serial scene data to the two dimensional Hadamard transform coefficients used in the present system.

The components of the circuits which are used in combination to produce the pattern recognition machinery of the present invention are well known to the signal processing and computer arts. Therefore, in the following descriptions and in the drawings, these components and circuits are referenced in terms of functional blocks rather than by specific circuit descriptions. It is to be understood that machines in accordance with present invention may be constructed in digital computer form; in which case the above-mentioned circuit components may, by way of example, comprise digital registers, core or active memory elements, digital adders, subtractors, multipliers, multiplexers, and other elements well known to the digital computer art. Likewise, machines in accordance with the present invention may be constructed in analog processor form, in which case the circuit components may, for example, comprise analog sample and hold circuits, operational sum and difference amplifiers, analog multipliers, multiplexers and switching circuits, and the like. Persons skilled in the art will likewise recognize that a general purpose digital computer may be operated in a manner to simulate the operation of the above-mentioned digital or analog circuit elements. Likewise, a suitably connected and programmed analog computer will function in the same manner as the above-described circuit elements and may be used to simulate or operate in the same manner as the described machines. It is intended by the present invention to include all such machines as comprise computational modules which, being functionally connected in the topology described below, function to compute line angle and scene peripheral segment characteristics within the scope of the claimed invention.

The scene information in the following descriptions of the embodiments of our invention is represented as pictorial data which is encoded by means of television scanning devices. It is to be understood, however, that these forms are merely illustrative of the operation of the invention and that the scene data may, for example, represent pictorial information, written information, radar or sonar return information, x-ray image information, or any other two dimensional data set. Likewise, the electrical scene encoding devices utilized with the invention may, for example, comprise television cameras, solid state scanning devices, computer memory elements, radar or sonar receivers, or other information storage or production devices, of any type, known to the various arts.

The periphery of a scene often contains information which is useful in guiding search operations. Thus, a line tracing program may first seek to identify line or edge information at the periphery of a scene and then follow the course of that line or edge through the scene. A pattern recognition machine examining a large data set may first examine a smaller subset and, by determining the position and angles of lines at the edge of that subset, guide further search operations into adjacent areas.

Figure 1:
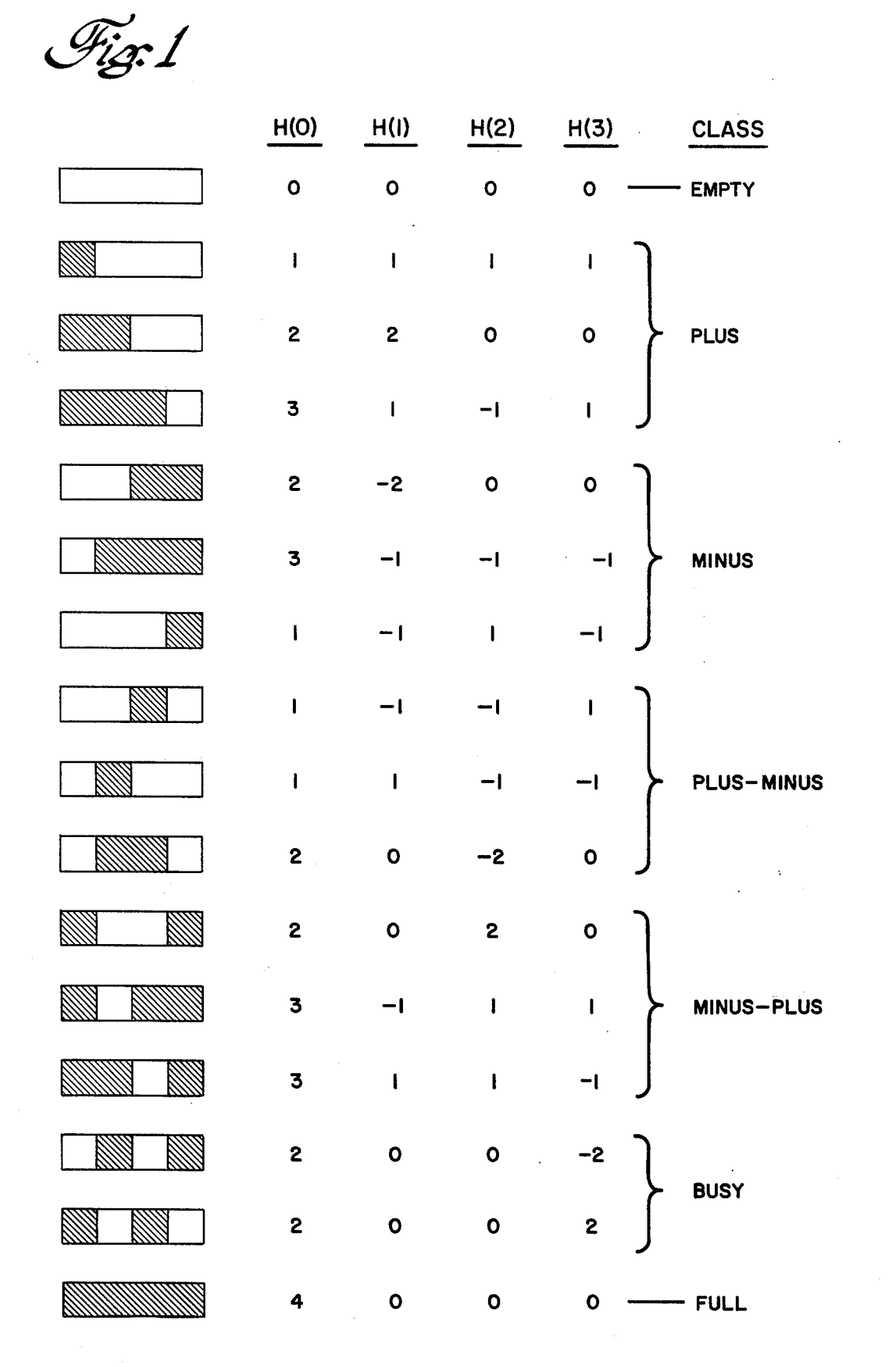
FIG. 1 indicates the pattern characteristics and corresponding Hadamard transform coefficients in various classes of one dimensional data patterns.

FIG. 1 identifies seven classes of scene periphery information which we have found useful in such machines: (1) The EMPTY class which indicates no data information on the scene periphery; (2) The PLUS class, which identifies a positive transition in the scene periphery; (3) the MINUS class, which identifies a negative transition in the scene periphery; (4) the PLUS-MINUS class, which identifies a black line element crossing the scene periphery; (5) the MINUS-PLUS class, which identifies a white line element crossing the scene periphery; (6) the BUSY class, which identifies several data transitions in the scene periphery; and (7) the FULL class, which identifies only black values in the scene periphery. In FIG. 1 illustrations of one dimensional data functions in a scene periphery are identified with tabular values of the corresponding Hadamard transform coefficients of sequency 0, 1, 2, and 3. We have determined that periphery segments of these types may be sorted into the seven indicated classes by a simple logic operation using only three of the four lowest sequency, one dimensional Hadamard transform coefficients.

Figure 2:
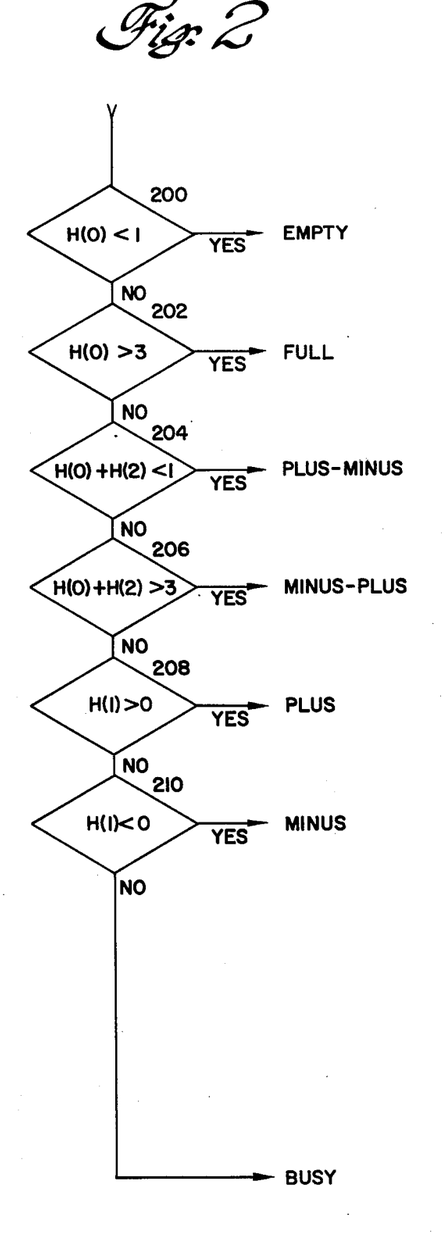
FIGS. 2 and 2a represent logic operation sequences for classifying the pattern characteristics of FIG. 1 on the basis of low order Hadamard transform coefficients.

FIG. 2 illustrates a logic sequence employed to classify the peripheral edge segments of FIG. 1. Selected Hadamard transform coefficients are compared with known values and the relative magnitudes determined by these comparisons are used to classify the peripheral segments. In logic block 200 the value of the lowest sequency coefficient, H(O), is compared with a signal of value 1. If the coefficient is less than 1, the peripheral segment is known to be EMPTY. If the lowest sequency coefficient H(O) is not less than 1, as determined in logic block 200, it is compared, in logic block 202, with another reference signal of value 3. If the coefficient is greater than 3, the peripheral segment is known to be FULL. If H(O) is not greater than 3, the sum of H(O) and H(2) is compared with a reference signal of value 1 in logic block 204. If the sum is less than 1, the line segment is known to be of the PLUS-MINUS type. If the sum is not less than 1 it is compared with another reference signal of value 3 in the logic block 206. If the sum is greater than 3 the peripheral segment is known to be of the MINUS-PLUS type. If the sum is not greater than 3, the value of the coefficient H(1) is compared, in logic block 208, with another reference of value signal. If H(1) is greater than 0, the peripheral segment is known to be of the PLUS type. If H(1) is not greater than 0, it is compared with another reference signal of value 0, is logic block 210. If H(1) is less than 0, the peripheral line segment is known to be of the MINUS type. If H(1) is not less than 0 the peripheral line segment is known to be of the BUSY type.

The peripheral segments of actual data scenes may contain noise components which will degrade the character of transitions from those illustrated in FIG. 1. The corresponding Hadamard transform coefficients of these degraded scene signals may have values lying slightly above or below those indicated in the table of FIG. 1. The values of the reference signals utilized in the comparison operations illustrated in FIG. 2 may be modified to provide superior classification performance in the presence of degraded Hadamard transform coefficient values. A logic flow chart illustrating the classification procedure utilizing modified reference signal values which lie half way between possible ideal Hadamard transform coefficient values is illustrated in FIG. 2a.

Figure 2A:
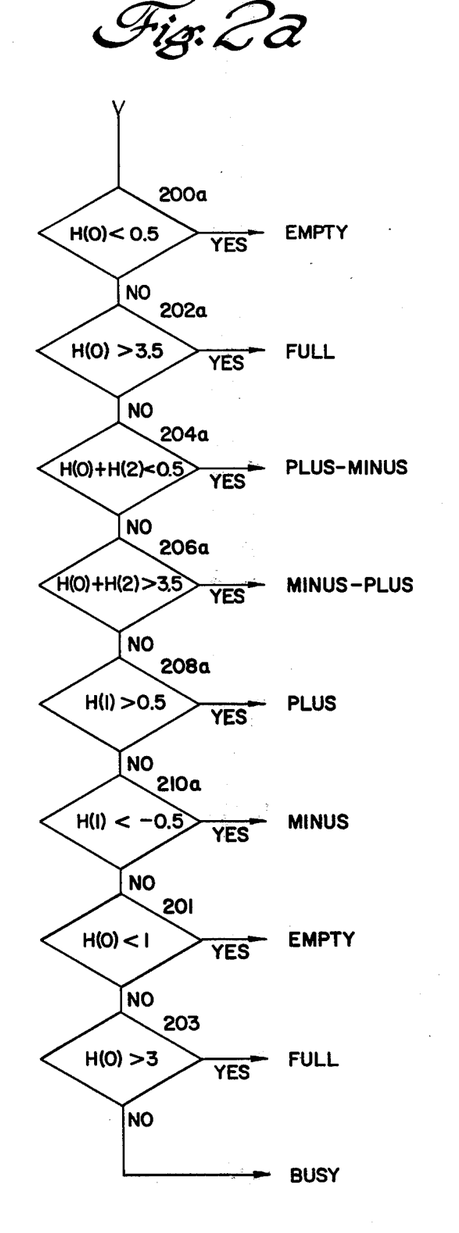

In FIG. 2a, logic blocks 200a through 210a correspond to logic blocks 200 through 210 in FIG. 2. Only the values of the reference signals have been changed. The ambiguity introduced introduced into the logic decision flow by the application of intermediate value transform coefficient signals necessitates further classification following the logic operations performed in block 210a. If the value of H(1) is less than −0.5, the coefficient H(O) is compared with a reference signal of value 1. If H(O) is less than 1, the peripheral line segment is known to be of the EMPTY type. This logic operation is illustrated in block 201. If the transform coefficient value is not less than 1, it is compared with a reference signal of value 3 in logic block 203. If H(O) is greater than 3, the peripheral line segment is known to be of the FULL type. If H(O) is not greater than 3, the peripheral line segment is known to be of the BUSY type.

Those skilled in the art appreciate that the reference values in this logic sequence may be chosen to lie at any point between the ideal transform coefficient values and that a knowledge of the statistics of the scene data will allow the reference values to be chosen in a manner, well known in the signal processing art, which minimizes the probability of error in determining classifications.

Figure 3:
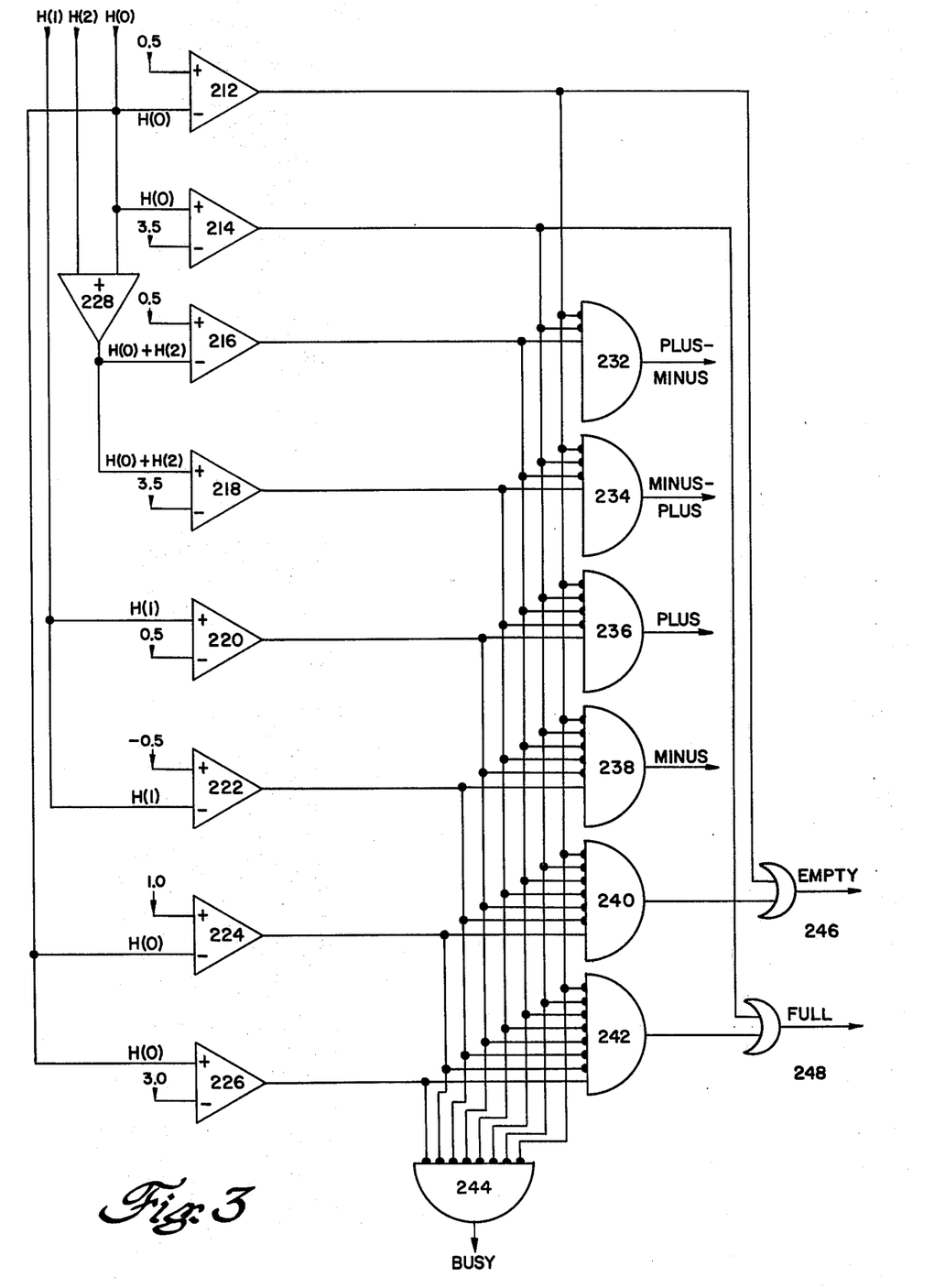

FIG. 3 is a machine for performing the logic indicated in FIG. 2a. The machine of FIG. 3 comprises eight level comparators 212, 214, 216, 218, 220, 222, 224 and 226. These circuits function to provide a positive logic output level when a first input designated + has a greater magnitude than a second input designated −. A reference signal with a level of 0.5 is applied to the + input of a level comparator 212 while a signal representative of the lowest sequency one dimensional Hadamard transform coefficient of a peripheral scene segment, H(O), is applied to the − input of the comparator 212. The output of the comparator 212 will, therefore, be a positive logic level is H(O) is less than 0.5 signifying that the peripheral scene segment is in the EMPTY class.

The transform coefficient signal H(O) is also applied to the + input of a second level comparator 214 while a reference signal with a level of 3.5 is applied to the − input of that comparator. The output of the comparator 214 will thus have a positive logic level if the transform coefficient signal H(O) is greater than 3.5 which signifies that the peripheral scene segment is in the FULL class.

The lowest sequency Hadamard transform coefficient signal H(O) and the Hadamard transform coefficient signal of sequency 2, H(O), of the one dimensional peripheral scene segment are added in a summing circuit 228. The output of the summing circuit, representative of the sum of those Hadamard transform coefficients, is applied to the − input of a level comparator 216 while a reference signal of level 0.5 is applied to the + input of that comparator. The output logic level of comparator 216 will, therefore, be positive if the sum of the Hadamard transform coefficients H(O) and H(2) is less than 0.5. The output logic level of comparator 216 is applied to the input of an AND gate 232 together with the complements of the outputs of comparators 212 and 214. In accordance with the logic flow of FIG. 2a, the output of AND gate 232 will be positive if the peripheral scene segment is in the PLUS-MINUS category.

The sum of the Hadamard transform signals H(O) and H(2) is also applied to the + input of a comparator 218 while a reference signal of level 3.5 is applied to the − input of that comparator. The output logic level of the comparator 218, while will be positive when the sum of the transform coefficients H(O) and H(2) is greater than 3.5, is applied to one of the inputs of an AND gate 234. The complements of the outputs of comparators 212, 214, and 216 are applied to additional inputs of the AND gate 234. The output of AND gate 234 will, therefore, be in the positive state when, in accordance with the flow chart of FIG. 2a, the peripheral scene segment is in the MINUS-PLUS class.

The Hadamard transform coefficient signal of the peripheral scene segment of sequency 1, (1), is applied to the + input of a level comparator 220 and to the − input of a level comparator 222. A reference signal of level 0.5 is applied to the − input of level comparator 220 while a reference signal of level −0.5 is applied to the + input of the level comparator 222. The output of the level comparator 220 will, therefore, be in a positive state when the Hadamard transform coefficient, H(1), is greater than 0.5 while the output of a comparater 222 will be in a positive state when the Hadamard transform coefficient, H(1), is less than −0.5. The output of comparator 220 is applied to an input of an AND gate 236. The complements of the outputs of comparators 212, 214, 216, and 218 are likewise applied to inputs of the AND gate 236. The output of the AND gate 236 will, therefore, be positive when the scene line segment is in the PLUS class. The output of comparator 222 is, likewise, applied to an input of an AND gate 238 while the complements of the outputs of the comparators 212, 214, 216, 218, and 220 are applied to additional inputs of the AND gate 238. The output of the AND gate 238 will be positive if the peripheral scene segment is in the MINUS class.

The Hadamard transform coefficient signal of 0 sequency, H(O) is also applied to the − input of level comparator 224 and to the + input of level comparator 226. A reference signal of level 1.0 is applied to the − input of level comparator 224 and a reference signal of level 3.0 is applied to the − input of level comparator 226. The output of level comparator 224 is combined in an AND gate 240 with the complements of the output of level comparators 212, 214, 216, 218, 220, and 222. The output of the AND gate 240 will be positive if the input signal is in the EMPTY class. The output of AND gate 240 and the output of level comparator 212 are combined in an OR gate 246. The output of the OR gate 246 will, therefore, be positive if the peripheral line segment is in the EMPTY class.

The output of level comparator 226 is combined in an AND gate 242 with the complements of the outputs of the other level comparators 212-224. The output of AND gate 242, which will be positive when the peripheral segment is in the FULL class, is combined with the output of level comparator 214 in an OR gate 248. The output of OR gate 248 will be positive only when the peripheral scene segment is in the FULL class.

The complements of the outputs of each of the comparators 212 through 226 are applied to the inputs of an AND gate 244. The output of AND gate 244 is positive if the peripheral scene segment is in the BUSY class.

Figure 4:
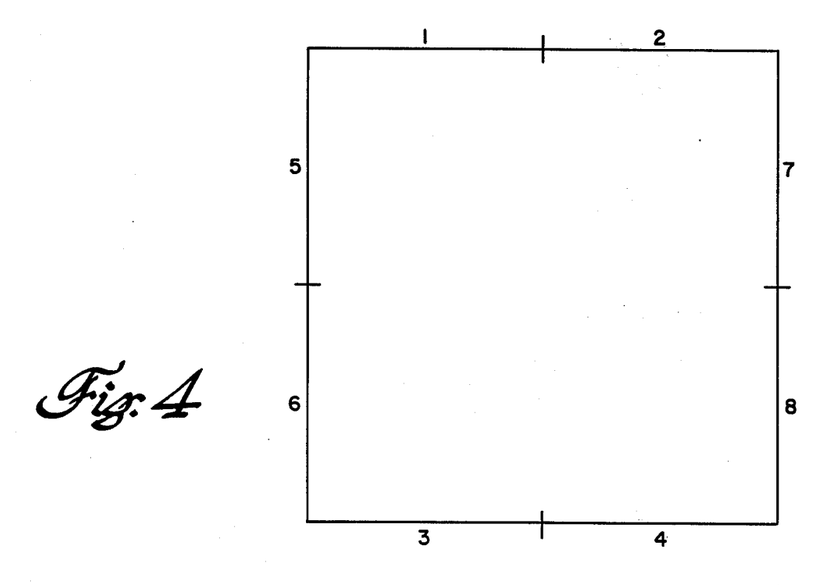
FIG. 4 illustrates the nomenclature used in describing scene peripheral segments.

If the one dimensional Hadamard transform coefficients representative of peripheral sections of a square scene section are applied to the circuit of FIG. 3, information regarding line and edge crossings in each of those peripheral sections may be determined. For the sake of convenience in the following discussion, the peripheral sections of a square scene are identified by the numbers 1 through 8 as indicated in FIG. 4.

Figure 5A:
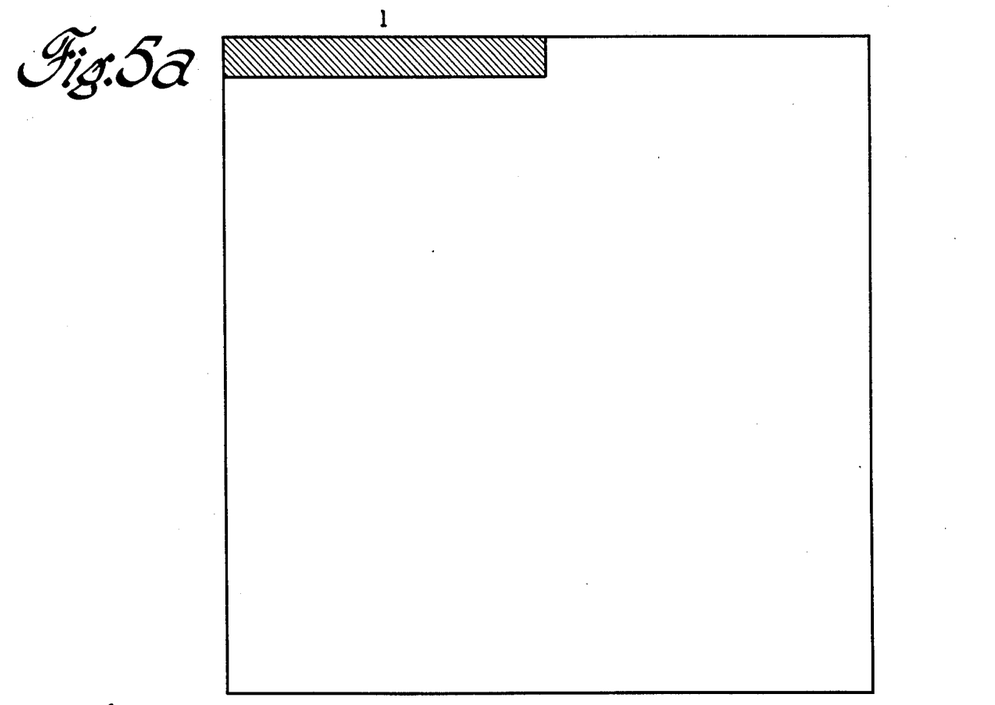
Figure 5B:
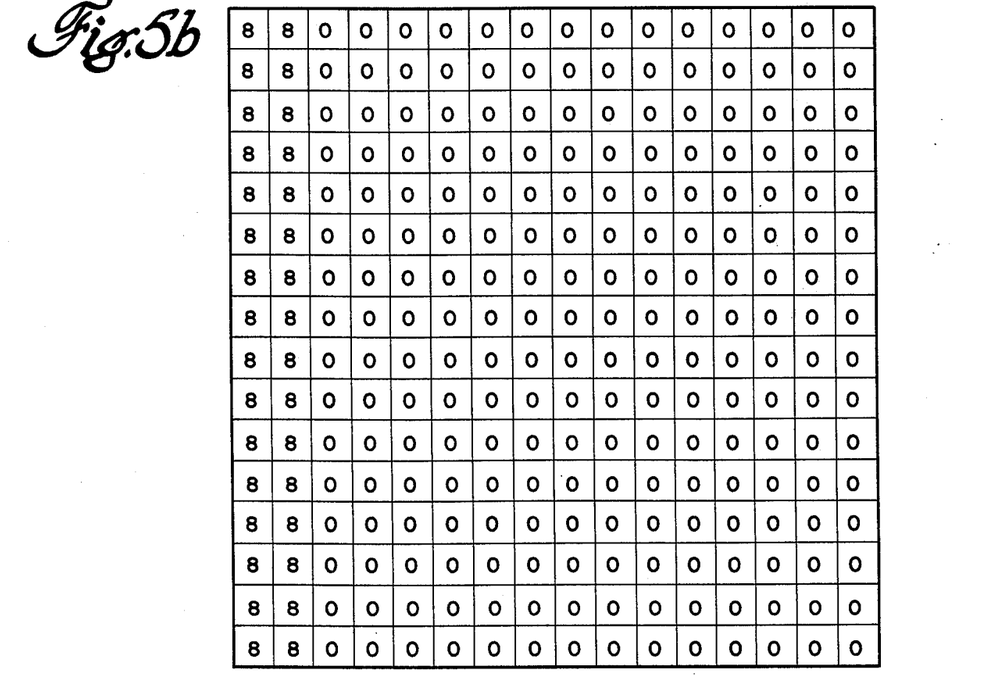

FIG. 5a represents a square binary scene having positive element values along the peripheral segment 1 and zero values through the rest of the scene. FIG. 5b represents the two dimensional Hadamard transform coefficient matrix of the scene of FIG. 5a. The first two columns of the Hadamard transform matrix of FIG. 5b have equal positive values while the remaining elements of the matrix have 0 value.

Figure 6A:
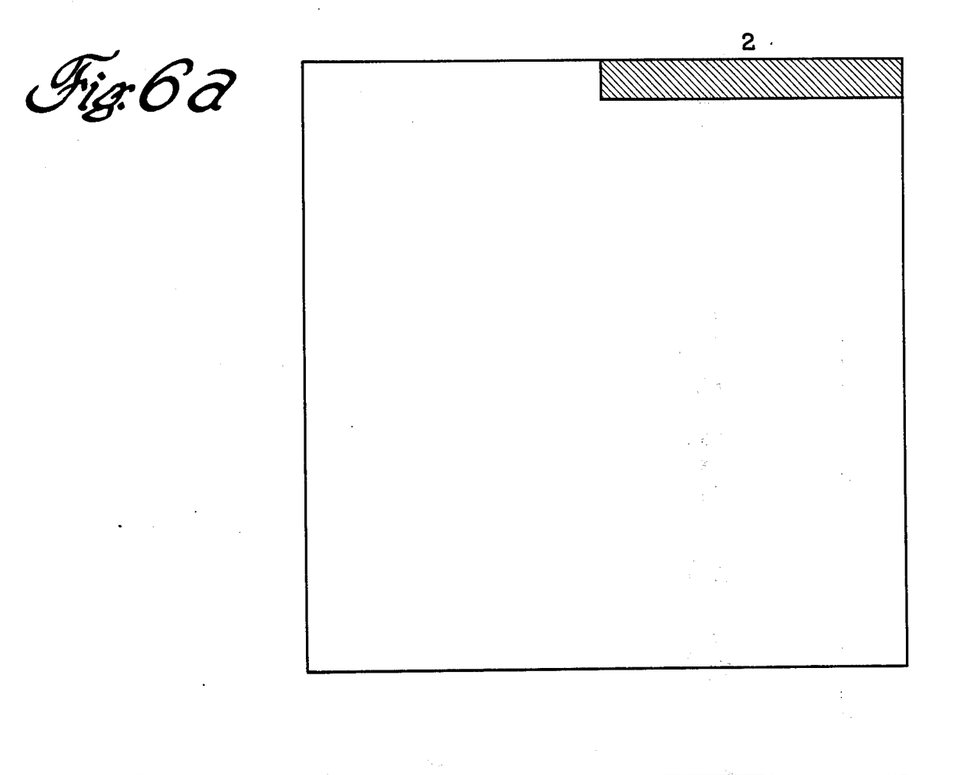
Figure 6B:
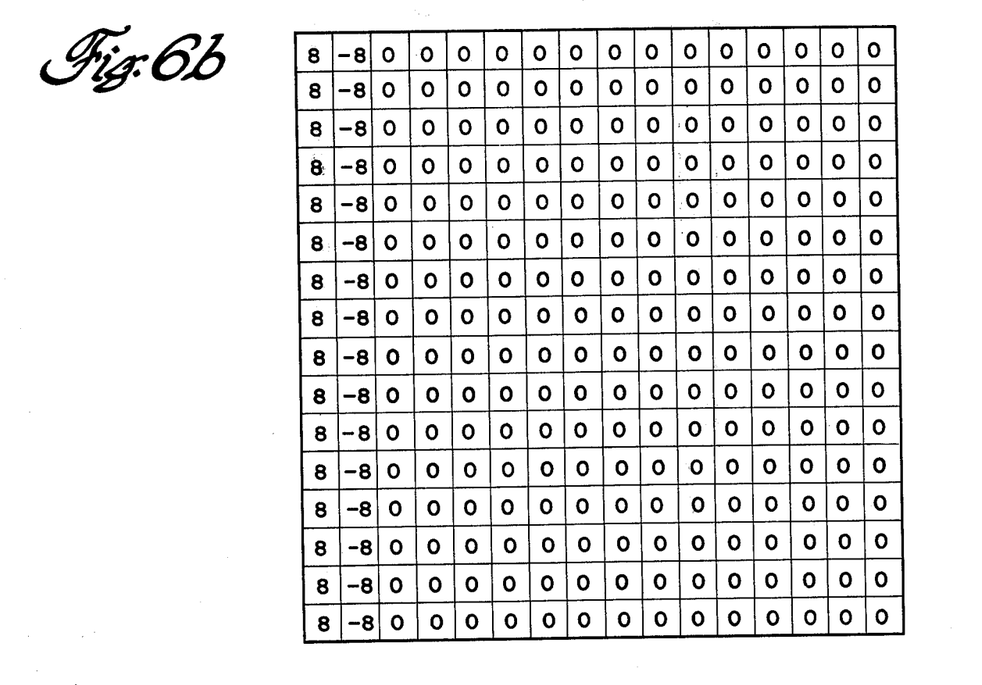

FIG. 6a, likewise, represents a square binary scene having elements with positive value along the peripheral segment 2 and elements of 0 value throughout the remainder of the scene. FIG. 6b represents the Hadamard transform coefficient matrix of the scene of FIG. 6a. It will be noted that the first column of the Hadamard transform matrix contains elements of equal positive value; the second column of the Hadamard transform matrix contains elements of equal negative value, and the remainder of the elements of the matrix are 0.

Figure 7A:
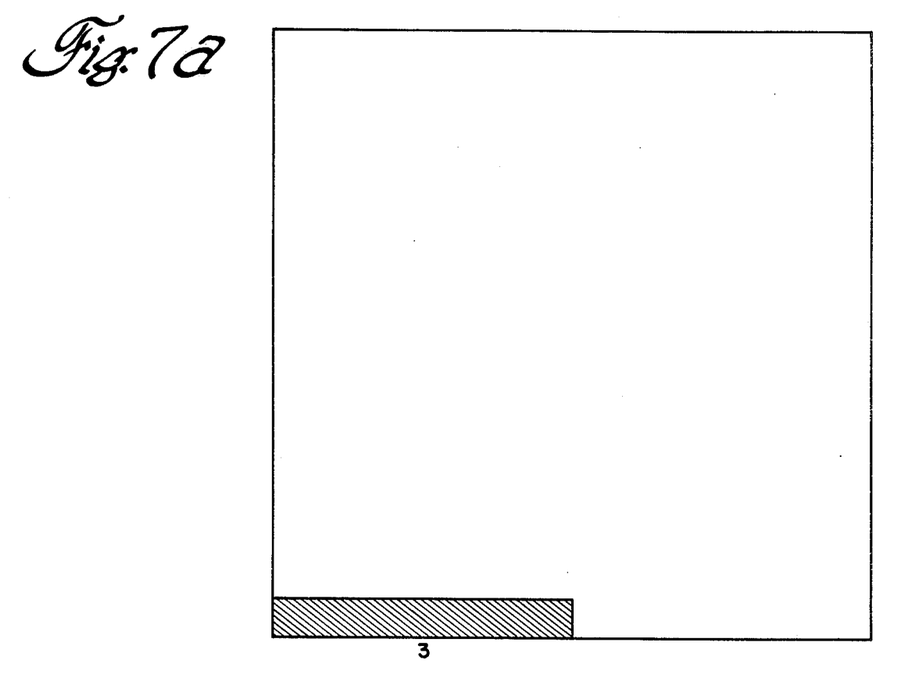
Figure 7B:
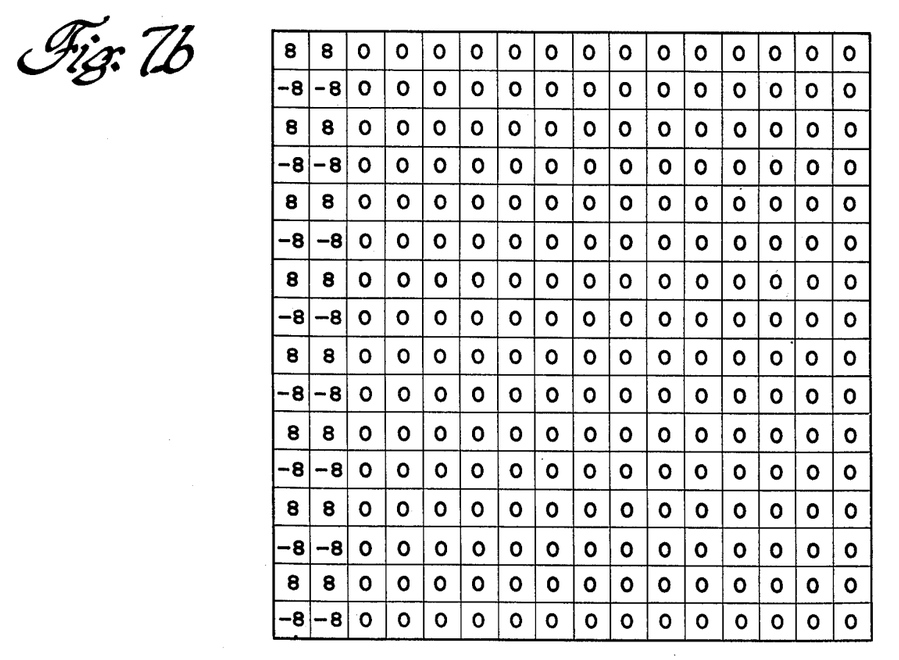

FIG. 7a, likewise, represents a square binary scene having positive element values along peripheral segment 3. The values of the Hadamard matrix of the scene of FIG. 7a are represented in FIG. 7b. It may be seen that the first two columns of the matrix contain elements of equal value and alternating sign while the remainder of the Hadamard matrix contains elements of 0 value.

Figure 8A:
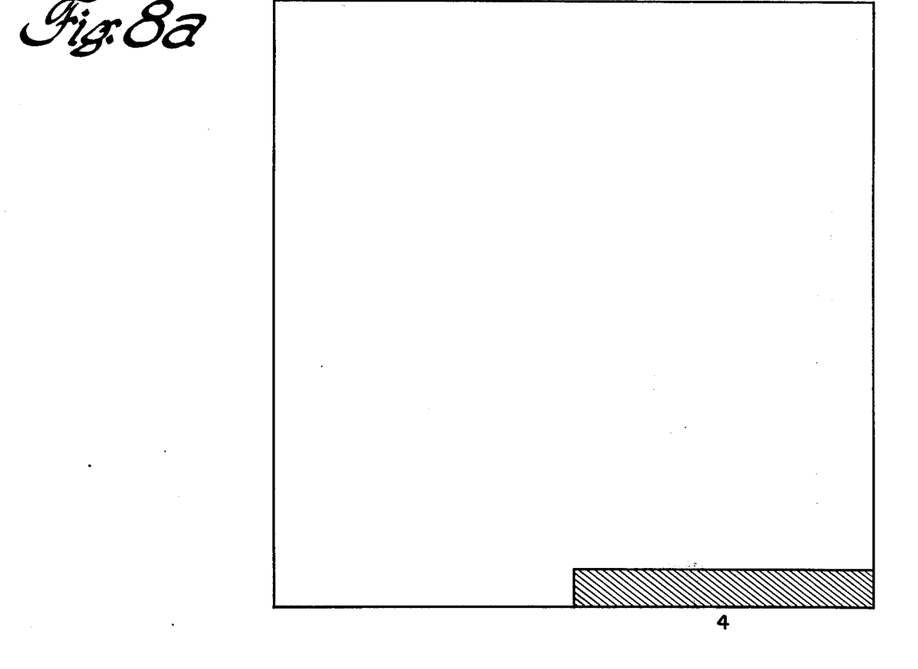
Figure 8B:
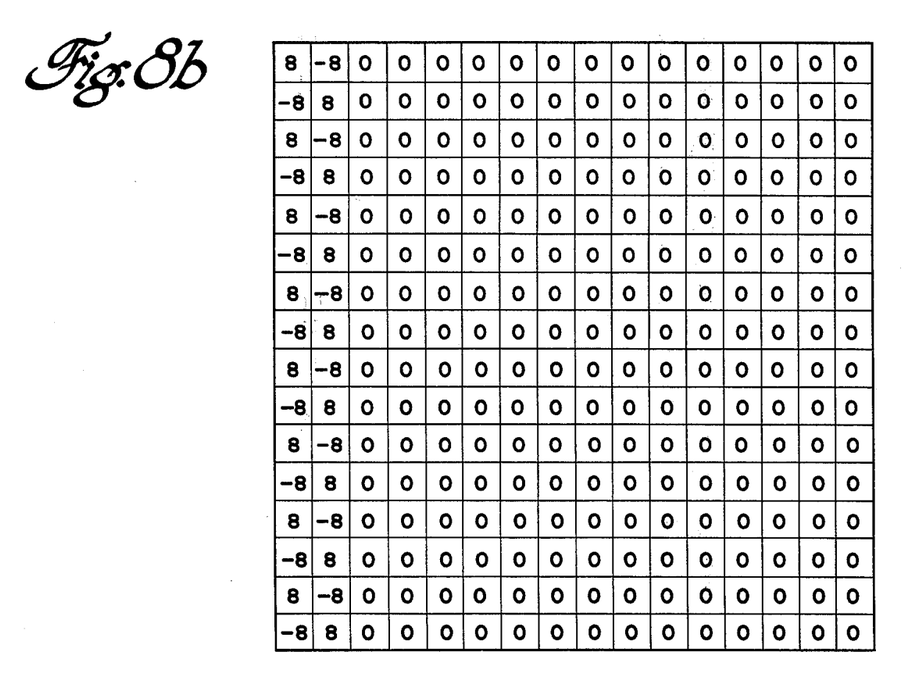

FIGS. 8a and 8b represent respectively a binary square scene having positive elements along segment 4 and Hadamard transform matrix of that scene. It will be noted that once again the Hadamard transform contains elements of equal magnitude in the first two columns and of 0 value elsewhere. The signs of the elements of the first two columns of the Hadamard matrix of FIG. 8b alternate between columns and rows in the manner illustrated.

The Hadamard transform matrices of FIGS. 5a through 8a represent the transforms of one dimensional, peripheral line segments having sequency 0. The corresponding one dimensional Hadamard transform coefficients, of sequency 0, along an equivalent peripheral segment of a scene may be obtained by weighting the two dimensional Hadamard transform coefficient matrix of the scene by the indicated characteristic matrices in FIGS. 5b through 8b and dividing the result by a normalizing coefficient of value 8.

The corresponding one dimensional Hadamard transform coefficients for the peripheral line segments having sequencies of 1 and 2 may likewise be determined by weighting the scene transform matrix by Hadamard corresponding to those of FIGS. 5b–8b but having their respective non-zero values in the third and fourth or the fifth and sixth matrix columns, respectively.

Figure 9:
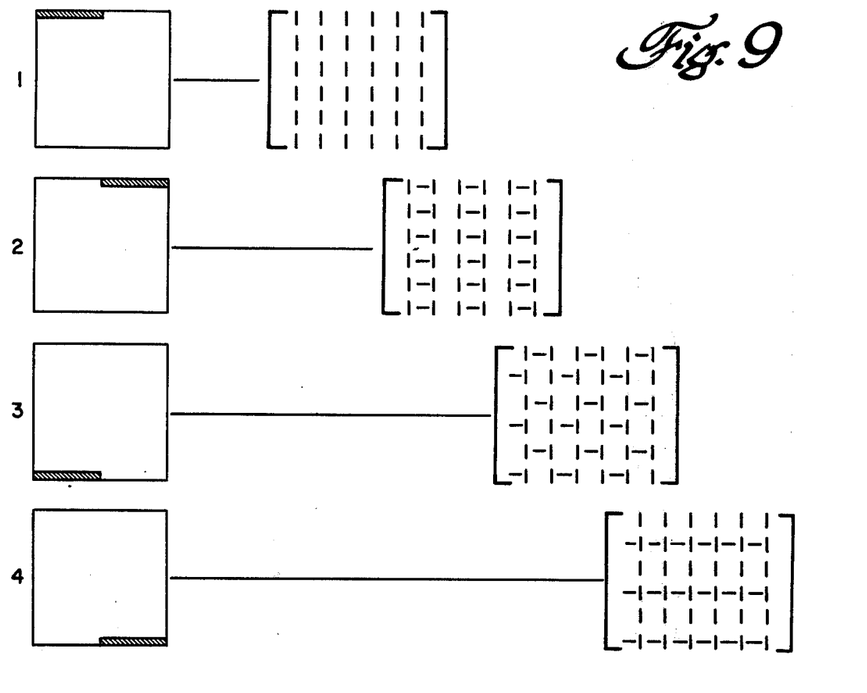
FIG. 9 illustrates weighting matrices which may be used to extract the one dimensional Hadamard transform coefficients of peripheral scene segments from a two dimensional scene transform matrix.

The three lowest order, one dimensional Hadamard transform coefficients of peripheral scene segments 1–4 may, therefore, be obtained by weighting the elements of the leading principal minor of rank 6 derived from the scene Hadamard transform matrix with the matrices illustrated in FIG. 9. The lowest sequency one dimensional transform coefficient H(O) is obtained by adding the elements in the first two columns of the weighted submatrix. Likewise, the Hadamard transform coefficients H(1) and H(2) may be obtained by respectively summing the elements of the third and fourth and of the fifth and sixth columns of the weighted submatrix.

The one dimensional Hadamard transform coefficients of the remaining scene peripheral segments, 5–8 may be obtained by transposing the Hadamard transform coefficient matrix of the original scene and performing similar operations on a corresponding leading principal minor: that is, the sub-matrix lying in the upper left-hand corner of the transposed matrix.

Figure 10:
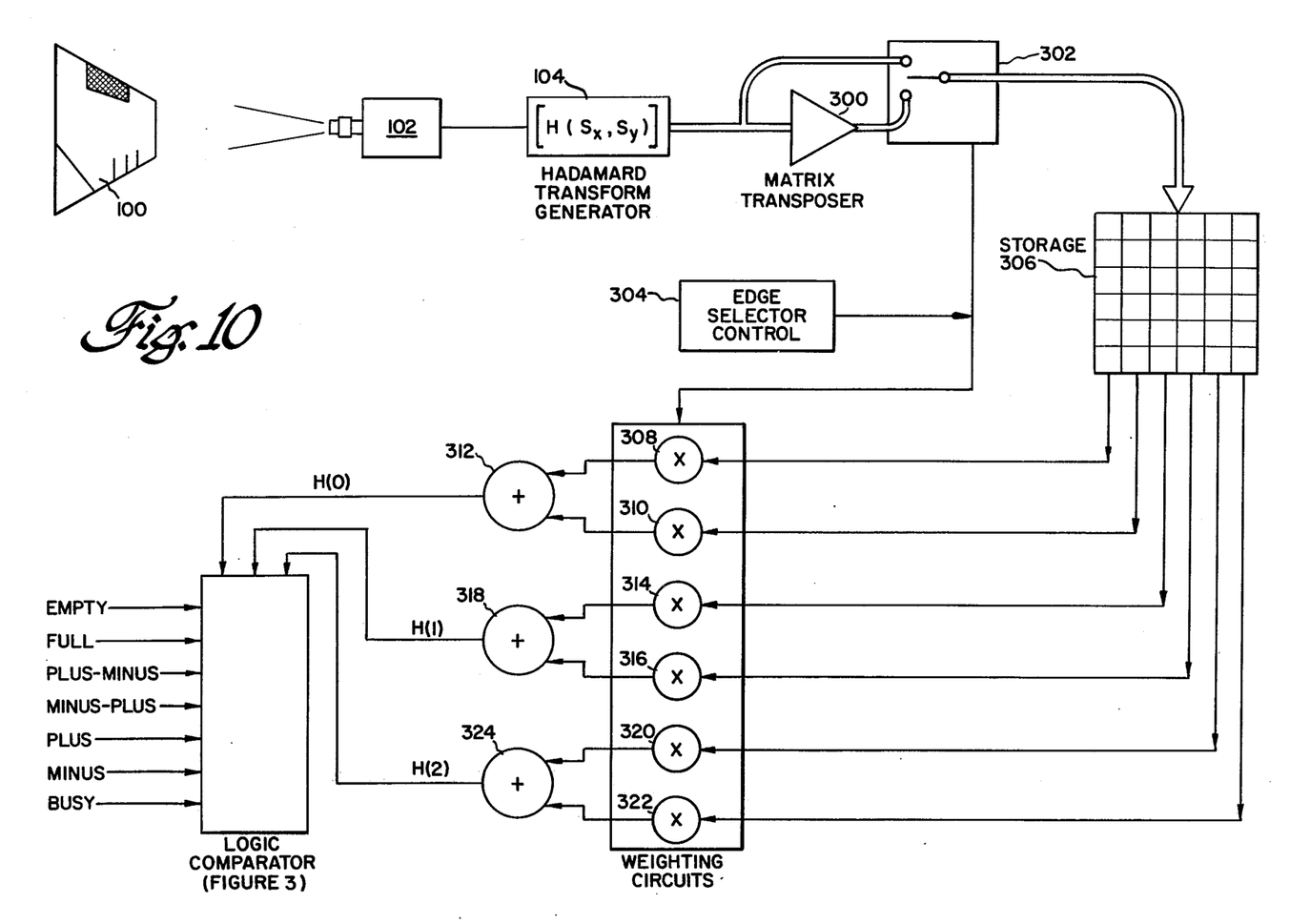
FIG. 10 is a machine for classifying peripheral pattern characteristics from video data.

FIG. 10 is a machine for performing a classification of scene peripheral segments in accordance with the foregoing discussion. A scene 100 is scanned by an encoding device 102 to produce an electrical signal which undergoes two dimensional Hadamard transformation in a transform generator circuit 104. The output of the generator is applied to a matrix transposer 300 which is adapted for producing at its output, a signal representative of a transpose of a matrix signal applied to its input. The output of the Hadamard transform generator 104 and the output of the matrix transposer 300 are, respectively, connected to the poles of a single pole-double throw switching circuit 302. The switching circuit 302 operates under the influence of a control signal supplied by an edge selector control circuit 304. Under the influence of the control circuit, the switching circuit 302 produces at its output either the sequency ordered Hadamard transform coefficient matrix produced by the transform generator 104 or a transpose of that matrix. The output of the switch 302 is applied to a storage register 306 which is adapted for storage and reproduction of the sequency ordered elements in the matrix signals. The storage register 306 need only be large enough to contain the elements of a rank 6 leading principal minor of the transform coefficient matrix which is applied to its input. If the circuit of the present embodiment is combined with other Hadamard transform processing circuits, it may be desirable, however, to use a larger array of storage elements for the storage register 306. The elements of the first two columns of the lowest sequency submatrix of rank 6, reproduced from the storage register 306, are applied to weighting circuits 308 and 310. The weighting circuits operate under the influence of the edge selector control circuit to selectively invert the sign of the elements of the submatrix in accordance with the signs of the respective elements in a matrix characteristic of the peripheral segment under investigation (indicated in FIG. 9). The outputs of the weighting circuits 308 and 310 are summed in an adding circuit 312. The output of the adding circuit 312 is the one dimensional, zero sequency Hadamard transform coefficient of the edge section under investigation, H(O).

Likewise, the elements from the second column pair in the submatrix are applied to weighting circuits 314 and 316 which invert the signs of respective column elements in accordance with the characteristic matrix of the peripheral segment under investigation. The outputs of the weighting circuits 314 and 316 are added in a summing circuit 318, the output of which represents the one dimensional Hadamard transform coefficient H(1).

The elements of the fifth and sixth columns of the submatrix are likewise applied to weighting circuits 320 and 322. The sum of the outputs of the weighting circuits 320 and 322 is obtained in an adding circuit 324, the output of which represents the one dimensional Hadamard transform coefficient H(2).

The output signals from the three summing circuits 312, 318 and 324 are applied to a logic comparator circuit, which may be the circuit of FIG. 3, which circuit acts to classify the peripheral scene segments into the seven classes previously discussed.

The edge selector control circuit 304 thus acts to control the weighting circuits 308, 310, 314, 316, 320 and 322 and the matrix transposer 300 in a manner indicated in the discussion above to produce the one dimensional Hadamard transform coefficients of the selected peripheral scene segments. The edge selector control 304 may comprise a read-only memory circuit which sequentially selects the proper weighting coefficients and switch input signals characteristic of a desired scene peripheral segment.

In accordance with the present invention we have provided circuits for extracting scene pattern information by utilization of the Hadamard transform coefficient matrix of that scene. The circuits provide efficient noise rejection and information extraction capabilities and produce more useful information, with fewer components, than do pattern recognition machines of the prior art.

While the invention has been described in detail herein in accord with certain embodiments thereof, many modifications and changes therein may be effected by those skilled in the art. Accordingly, it is intended by the appended claims to cover all such modifications and changes as fall within the true spirit and scope of the invention.

The invention claimed is:

1. A machine for classifying peripheral pattern characteristics in two dimensional scene data, comprising in combination:

means responsive to electrical signal representative of two dimensional scene data and for producing therefrom a zeroth-coefficient signal representative of a one dimensional Hadamard transform coefficient of sequency zero from data patterns along a peripheral segment of said scene data, a first-coefficient signal representative of a one dimensional Hadamard transform coefficient of sequency one from data patterns along said peripheral scene segment, and a second-coefficient signal representative of a one dimensional Hadamard transform coefficient of sequency two from data patterns along said peripheral scene segment; and a logic means connected for comparing the values of said zeroth-coefficient signal, said first-coefficient signal, and said second-coefficient signal with a plurality of signals of known value and for producing therefrom pattern classification signals representative of the data patterns in said peripheral scene segments.

2. The machine of claim 1 wherein said logic means comprise a comparator circuit connected to receive said zeroth coefficient signal and to produce a first output signal if the value of said zeroth-coefficient signal is less than the value of a known signal, said known signal having a value greater than zero, whereby said first output signal is representative of peripheral data patterns containing only negative data elements.

3. The machine of claim 1 wherein said logic means comprise a comparator circuit connected to receive said zeroth-coefficient signal and to produce a second output signal if the value of said zeroth-coefficient signal is less than the value of a known signal, said known signal having a value greater than or equal to three, whereby said second output signal is representative of peripheral data patterns containing only positive data elements.

4. The machine of claim 1 wherein said logic means comprise a comparator circuit connected to receive said zeroth-coefficient signal and said second-coefficient signal and to produce therefrom an intermediate signal if the value of the sum of the value of said zeroth-coefficient signal added to the value of said second-coefficient signal is less than the value of a known signal, said known signal having a value less than one; and AND logic means connected to receive said intermediate signal and a logic signal representative of the condition that said peripheral data pattern does not contain either only positive data elements or only negative data elements produce a third output signal upon the conjunction of said intermediate signal with said logic signal, whereby said third output signal is representative of peripheral data patterns containing transitions from positive data elements to negative data elements.

5. The machine of claim 1 wherein said logic means comprise a comparator circuit connected to receive said zeroth-coefficient signal and said second-coefficient signal and to produce therefrom an intermediate signal if the value of the sum of the value of said zeroth-coefficient signal added to value of said second-coefficient signal is greater than the value of a known signal, said known signal having a value greater than three; and AND logic means connected to receive said intermediate signal and a logic signal representative of the condition that peripheral data pattern does not contain either only positive data elements, only negative data elements, or transitions from positive to negative data elements, and to produce a fourth output signal upon the conjunction of said intermediate signal and said logic signal, whereby said fourth output signal is representative of peripheral data patterns containing transitions from negative data elements to positive data elements.

6. The machine of claim 1 wherein said logic means comprise a comparator circuit connected to receive first coefficient signal and to produce an intermediate signal if the value of said first coefficient signal is greater than the value of a known signal, said known signal having a value greater than zero; and AND logic means connected to receive said intermediate signal and a logic signal representative of the condition that said peripheral data pattern does not contain either only positive data elements, only negative data elements, transitions from positive to negative data elements, or transitions from negative data elements to positive data elements and to produce a fifth output signal upon the conjunction of said intermediate signal and said logic signal, whereby said fifth output signal is representative of peripheral data patterns containing positive element line segments.

7. The machine of claim 1 wherein said logic means comprise a comparator circuit connected to receive said first-coefficient signal and to produce an intermediate signal if the value of said first-coefficient signal is less than the value of a known signal, said known signal having a value less than one; and AND logic means connected to receive said intermediate signal and a logic signal representative of the condition that said peripheral data pattern does not contain either only positive data elements, only negative data elements, transitions from positive data elements to negative data elements, transitions from negative data elements to positive data elements, or positive element line segments and to produce a sixth output signal upon the conjunction of said intermediate signal and said logic signal, whereby said sixth output signal is representative of peripheral data patterns containing negative element line segments.

8. The machine of claim 1 wherein said logic means comprises AND logic means connected to receive a logic signal representative of the condition that said peripheral data pattern does not contain either only negative data elements, only positive data elements, transitions from positive to negative data elements, transitions from negative to positive data elements, positive element line segments, or negative element line segments, and to produce a seventh output signal upon the occurrence of said logic signal, whereby said seventh output signal is representative of peripheral data patterns containing complex element transitions.

9. The machine of claim 1 wherein said means for producing coefficient signals comprise:

a matrix generator connected to receive said scene data and to produce therefrom a matrix signal representative of a rank 6 submatrix from a sequency ordered, Hadamard transform coefficient matrix of said scene data;

weighting means including circuits for generating signals representative of a characteristic matrix of a peripheral scene segment and computing circuits connected for producing a weighted output signal representative of said submatrix multiplied by said characteristic matrix; and arithmetic means connected for receiving said weighted output signal and for respectively summing the values of elements in the first and second columns, the third and fourth columns, and the fifth and sixth columns of the matrix represented by said weighted output signal, whereby said zeroth-coefficient signal, said first-coefficient signal and said second-coefficient signal are respectively produced.

10. The machine of claim 9 wherein said submatrix is a leading principal minor of said Hadamard transform coefficient matrix.

11. The machine of claim 9 wherein said submatrix is a leading, principal minor of the transpose of said Hadamard transform coefficient matrix.

12. A machine for calculating one dimensional Hadamard transform coefficients along a peripheral segment of a two dimensional data scene comprising:

means for weighting, connected to receive a signal representative of a two-dimensional, sequency ordered, Hadamard transform coefficient matrix of a scene and including circuits for generating signals representative of a characteristic matrix of a peripheral scene segment and computing circuits for producing a weighted output signal representative of the product matrix of a leading principal minor of said transform matrix multiplied by said characteristic matrix; and means for summing connected for receiving said weighted output signal and for producing therefrom one-dimensional transform output signals by summing the values of elements in pairs of adjacent columns in said product matrix; whereby the sum of elements in the first and second column of said product matrix is representative of a one-dimensional, sequency zero coefficient along said segment, the sum of elements in the third and fourth column of said product matrix is representative of a one-dimensional, sequency one coefficient along said segment, and the sums of elements in successive pairs of columns of said product matrix are, respectively, representative of one-dimensional coefficients of succeeding sequency along said segment.

13. The machine of claim 12 further comprising means for generating a sequency ordered, two-dimensional Hadamard transform coefficient matrix of said data scene and for supplying a signal representative thereof to said means for weighting.

14. The machine of claim 12 wherein said Hadamard transform coefficient matrix is a rank 6 matrix.

15. The machine of claim 14 wherein said peripheral segment is a top, left segment and said characteristic matrix is $$\begin{bmatrix} 1 & 1 & 1 & 1 & 1 & 1 \\ 1 & 1 & 1 & 1 & 1 & 1 \\ 1 & 1 & 1 & 1 & 1 & 1 \\ 1 & 1 & 1 & 1 & 1 & 1 \\ 1 & 1 & 1 & 1 & 1 & 1 \\ 1 & 1 & 1 & 1 & 1 & 1 \end{bmatrix}$$

16. The machine of claim 14 wherein said peripheral segment is a top, right segment and said characteristic matrix is $$\begin{bmatrix} 1 & -1 & 1 & -1 & 1 & -1 \\ 1 & -1 & 1 & -1 & 1 & -1 \\ 1 & -1 & 1 & -1 & 1 & -1 \\ 1 & -1 & 1 & -1 & 1 & -1 \\ 1 & -1 & 1 & -1 & 1 & -1 \\ 1 & -1 & 1 & -1 & 1 & -1 \end{bmatrix}.$$

17. The machine of claim 14 wherein said peripheral segment is a bottom, left segment and said characteristic matrix is $$\begin{bmatrix} 1 & 1 & 1 & 1 & 1 & 1 \\ -1 & -1 & -1 & -1 & -1 & -1 \\ 1 & 1 & 1 & 1 & 1 & 1 \\ -1 & -1 & -1 & -1 & -1 & -1 \\ 1 & 1 & 1 & 1 & 1 & 1 \\ -1 & -1 & -1 & -1 & -1 & -1 \end{bmatrix}.$$

18. The machine of claim 14 wherein said peripheral segment is a bottom, right segment of said characteristic matrix is $$\begin{bmatrix} 1 & -1 & 1 & -1 & 1 & -1 \\ -1 & 1 & -1 & 1 & -1 & 1 \\ 1 & -1 & 1 & -1 & 1 & -1 \\ -1 & 1 & -1 & 1 & -1 & 1 \\ 1 & -1 & 1 & -1 & 1 & -1 \\ -1 & 1 & -1 & 1 & -1 & 1 \end{bmatrix}.$$

19. The machine of claim 12 wherein said means for weighting and said means for summing are digital means.

20. A machine for classifying one dimensional data patterns comprising in combination:
    means for producing a signal H(O) representative of the sequency zero Hadamard transform coefficient of a data pattern, a signal H(1) representative of the sequency one Hadamard transform coefficient of said data pattern, and a signal H(2) representative of the sequency two Hadamard transform coefficient of said data pattern; and
    logic means including comparator circuits, AND gates, OR gates, summing circuits and inverter circuits connected for receiving the signals, H(0), H(1), and H(2), and a set of signals, $K(x): x = 1, 8$ of known value and for producing therefrom a set of classification signals C(y) in accordance with the Boolean equations:

$$C(1) = (H(0) < K(1))$$

$$C(2) = \overline{C(1)} \cap (H(0) > K(2))$$

$$C(3) = \overline{C(1)} \cap \overline{C(2)} \cap ([H(0) \cap H(2)] < K(3))$$

$$C(4) = \overline{C(1)} \cap \overline{C(2)} \cap \overline{C(3)} \cap ([H(0) \cap H(2)] > K(4))$$

$$C(5) = \overline{C(1)} \cap \overline{C(2)} \cap \overline{C(3)} \cap \overline{C(4)} \cap (H(1) > K(5))$$

$$C(6) = \overline{C(1)} \cap \overline{C(2)} \cap \overline{C(3)} \cap \overline{C(4)} \cap \overline{C(5)} \cap (H(1) < K(6))$$

$$C(7) = \overline{C(1)} \cap \overline{C(2)} \cap \overline{C(3)} \cap \overline{C(4)} \cap \overline{C(5)} \cap \overline{C(6)}.$$

21. The machine of claim 20 wherein K(1) has a value of 1, K(2) has a value of 3, K(3) has a value of 1, K(4) has a value of 3, K(5) has a value of 0, and K(6) has a value of 0.

22. The machine of claim 20 wherein said logic means are further connected to perform the Boolean equations:

$$C(9) = C(7) \cap (H(0) < K(7))$$

$$C(10) = C(8) \cap \overline{C(9)} \cap (H(0) > K(8))$$

$$C(8) = C(7) \cap \overline{C(9)} \cap \overline{C(10)}$$

and wherein K(1) has a value of 0.5, K(2) has a value of 3.5, K(3) has a value of 0.5, K(4) has a value of 3.5, K(5) has a value of 0.5, K(6) has a value of −0.5, K(7) has a value of 1, and K(8) has a value of 3.

* * * * *